(No Model.)  2 Sheets—Sheet 1.
F. G. DAVIS.
TWO WHEELED VEHICLE.
No. 270,285. Patented Jan. 9, 1883.
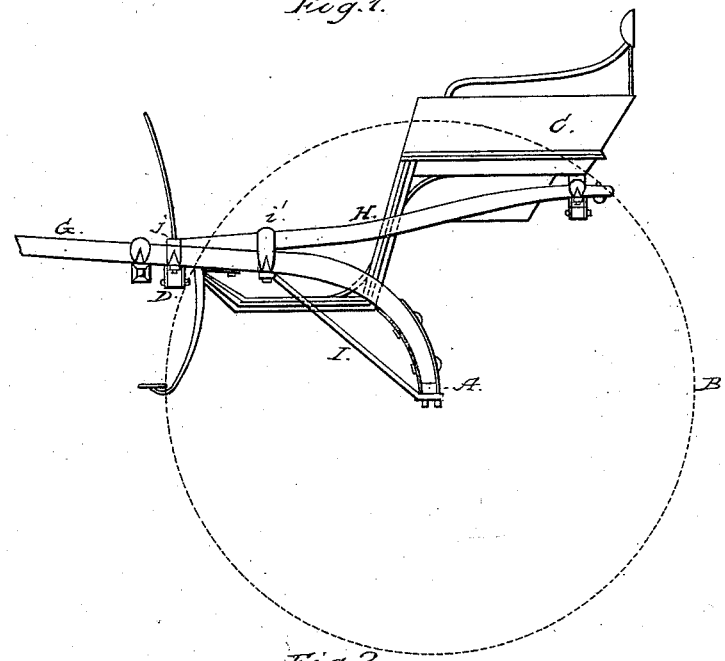
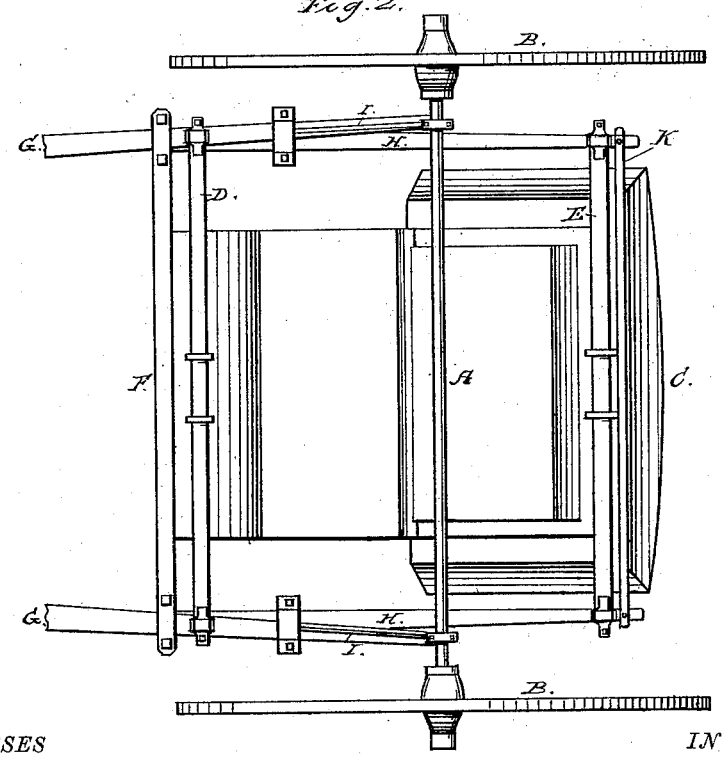
WITNESSES
F. W. Howard
W. C. Young.
INVENTOR
Francis G. Davis
by J. H. Doolittle
Attorney (No Model.) 2 Sheets—Sheet 2.

F. G. DAVIS.
TWO WHEELED VEHICLE.

No. 270,285. Patented Jan. 9, 1883.

WITNESSES
F. W. Howard
W. C. Young

INVENTOR
Francis G. Davis
by M. H. Doolittle
Attorney

UNITED STATES PATENT OFFICE.

FRANCIS G. DAVIS, OF WORCESTER, MASSACHUSETTS.

TWO-WHEELED VEHICLE.

SPECIFICATION forming part of Letters Patent No. 270,285, dated January 9, 1883.

Application filed July 18, 1882. (No model.)

*To all whom it may concern:*

Be it known that I, FRANCIS G. DAVIS, a citizen of the United States, residing at Worcester, in the county of Worcester and State of Massachusetts, have invented certain new and useful Improvements in Vehicles; and I do hereby declare the following to be a full, clear, and exact description of the invention, such as will enable others skilled in the art to which it appertains to make and use the same.

My invention relates to an improvement in two-wheeled vehicles of that class known as "road-carts;" and the objects of my improvement are the construction of a cart that is equally balanced when the horse is attached with or without a load, and which also is stronger, more simple and compact in arrangement, and easier riding than carts of this character heretofore in use.

It consists of the arrangement and combination of body, shafts, axle, and springs, illustrated in the accompanying drawings, in which—

Figure 3:
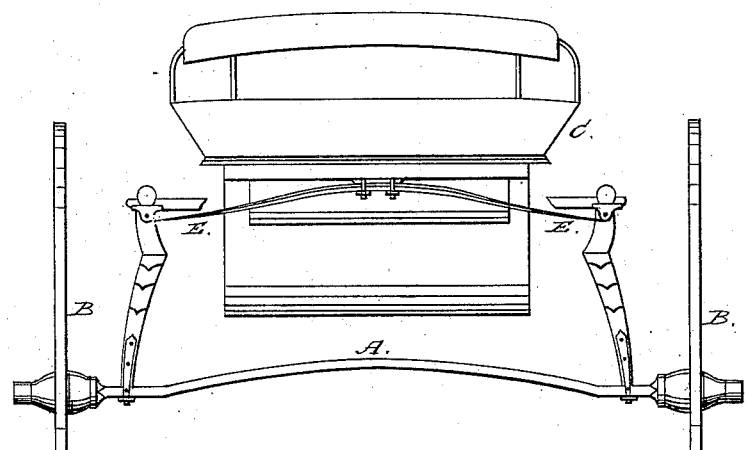
Figure 4:
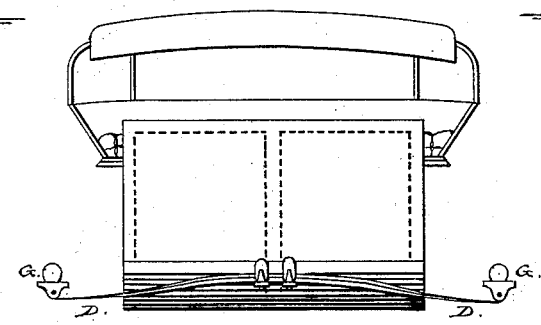

Figure 1 is a side view; Fig. 2, a bottom view; Fig. 3, a rear view, and Fig. 4 a front detail view, showing the connection of shafts and body to front spring.

Like letters indicate like parts in the several drawings.

A represents the axle, supported by wheels B B.

C is the body of a vehicle, the front and rear portions of which are supported directly upon springs D and E, to which they are connected by clips or loops. Both of said springs are half-elliptic in form. The front spring, D, is connected to the opposite sides of the shafts G either by clips or shackles. The shafts are also united by the usual draw-bar, F. The rear spring, E, is connected by means of clips or shackles to the curved side bars, H H, which bars run in the same direction with the shafts, and are connected therewith by clips $i$ and $j$. The rear ends of the side spring-bars are connected by cross-bar K. The rear ends of the shafts G extend back under the body of the vehicle, curved downwardly, and are connected rigidly to the axle, as shown in Fig. 1.

It will be seen that the body is supported entirely by the shafts, side spring-bars, and cross-springs, independent of any direct connection with the axle.

The vehicle may be provided, if desired, with any ordinary form of carriage-top.

The details of construction, as above set forth, so far as form of springs, side spring-bars, cross-bars, and shafts are concerned, and their means of connection, may be varied without departing from my invention, which I claim to be as follows:

1. The combination of the body connected directly to the cross-springs, the side spring-bars, the shafts, and the axle, substantially as described.

2. The shafts having their inner ends curved down to meet the axle, the rearwardly-projecting side spring-bars resting upon and rigidly connected to the top of said shafts, in combination with suitable springs and body, substantially as described.

3. The combination of the body, side curved spring-bars, H, end springs D and E, cross-bars F and K, shafts G, and axle A, substantially as described.

In testimony whereof I affix my signature in presence of two witnesses.

FRANCIS G. DAVIS.

Witnesses:
JNO. W. SIMS,
GEO. F. SWARTZELL.